United States Patent [19]

Gladwin

[11] 3,938,745
[45] Feb. 17, 1976

[54] BOTTLE CRUSHER

[76] Inventor: Floyd R. Gladwin, P.O. Box 1113, Southgate, Mich. 48192

[22] Filed: Oct. 10, 1974

[21] Appl. No.: 513,698

[52] U.S. Cl. .................................. 241/99; 241/100
[51] Int. Cl.² .................... B02C 13/18; B02C 19/12
[58] Field of Search ................... 241/99, 100, 185 R

[56] References Cited
UNITED STATES PATENTS

| | | | |
|---|---|---|---|
| 2,558,255 | 6/1951 | Johnson et al. | 241/99 |
| 2,628,036 | 2/1953 | Hall | 241/99 X |
| 3,655,138 | 4/1972 | Luscombe | 241/99 |

*Primary Examiner*—Roy Lake
*Assistant Examiner*—E. F. Desmond
*Attorney, Agent, or Firm*—Cullen, Settle, Sloman & Cantor

[57] ABSTRACT

A bottle crusher formed of an enclosed chute into which bottles are dropped, with a motor driven rotating plate arranged at the lower end of the chute to receive and break the bottles. The motor is located below the plate and mounted upon brackets arranged at spaced points around the periphery of the plate. Vanes are formed upon the upper surface of the plate, with the vanes sloped upwardly from the center of the plate toward the edges and with at least one vane terminating considerably inwardly of the plate edge to form a high point for breaking bottles landing upon it. The bottles are broken by the impacting of the vanes and fragments are thrown upwardly by the slope of the vanes for repeated dropping and impacting, as well as for breaking the bottles between the brackets and vanes, so that the crushed fragments of glass fall off the plate for collection below the plate and motor.

12 Claims, 10 Drawing Figures

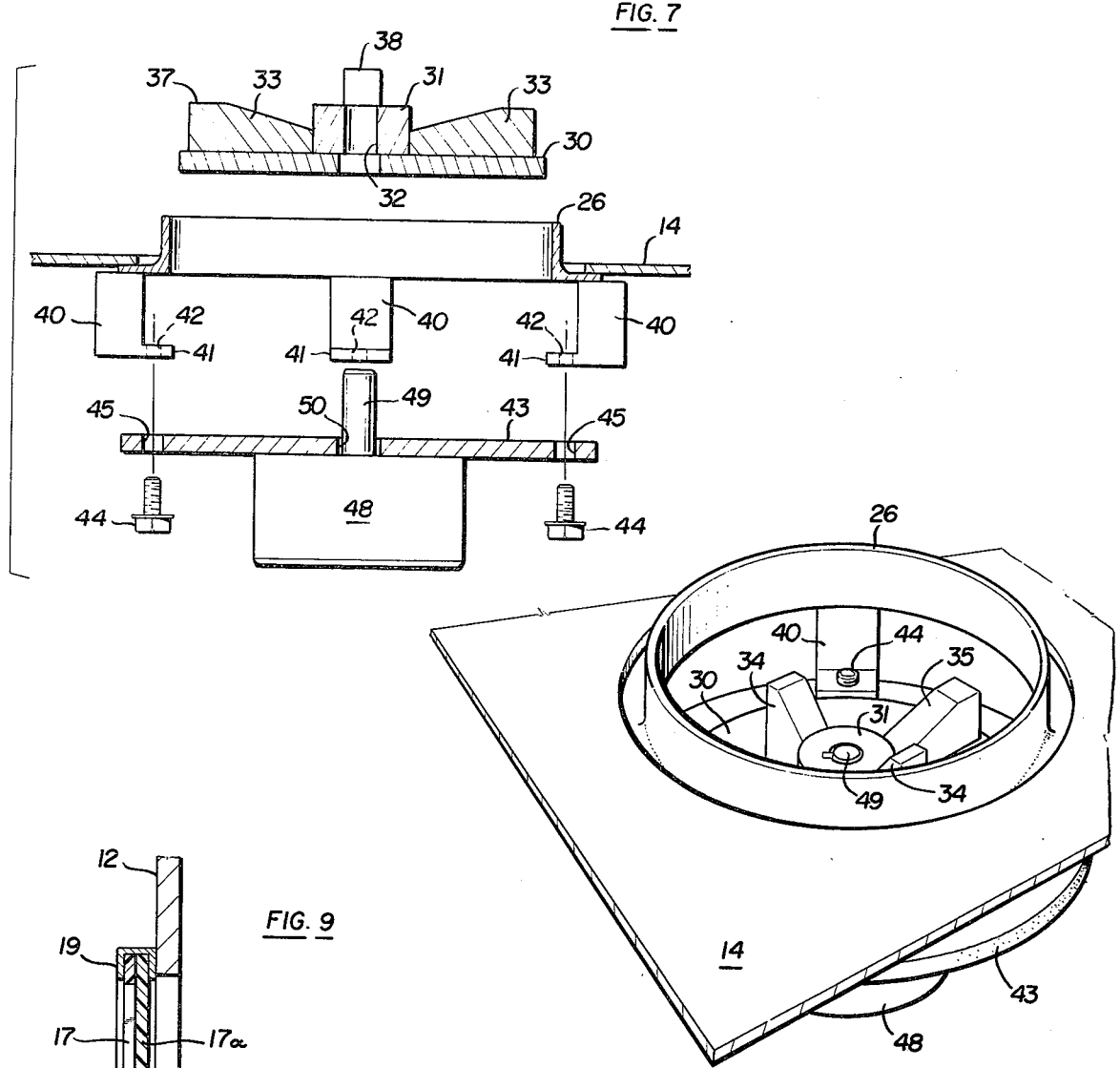
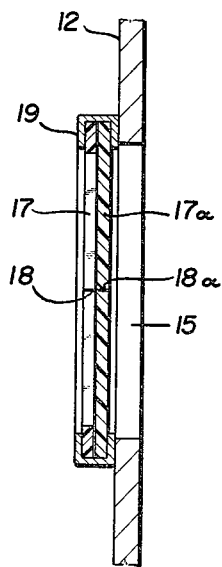
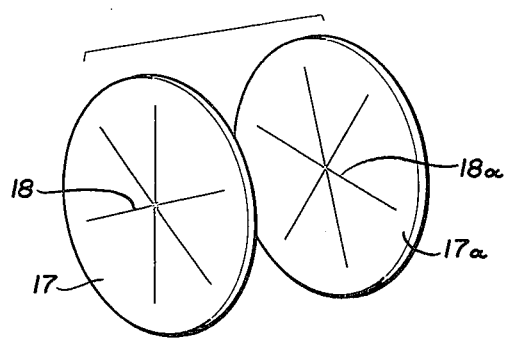

BOTTLE CRUSHER

BACKGROUND OF INVENTION

Various types of devices have been utilized for breaking or crushing bottles, jars, and the like glass articles. However, since the breaking of such type glass articles generally results in flying fragments which are relatively dangerous, as well as sharp edged multiple size fragments which are difficult to handle, there has been a need for a device which is not only safe, i.e., in guarding against flying fragments, but also which will function to break the glass into small size, easily handled fragments or particles, with very little, or almost no dust-like particles. Thus, the invention herein relates to an improved crusher or breaker for fragmentizing bottles, jars and other glass articles and which functions to crush the glass into small, relatively rounded particles or fragments which can be easily handled even by the human hand, without danger of injury and which is formed as a compact, relatively inexpensive unit easily utilized in various indoor locations without danger to persons in the surrounding area.

SUMMARY OF INVENTION

The invention herein contemplates a cabinet enclosed bottle breaker or crusher having an enclosed chute for receiving glass articles to be broken which articles fall upon a horizontally arranged, rapidly rotating plate having vanes formed to break the glass article upon initial impact with the plate and thereafter to crush and fragmentize the glass by repeated vane impact, into small, regular-sized, relatively rounded particles. The vanes themselves are formed to function as breaking anvils to shatter the glass landing thereon and in addition, are sloped upwardly and outwardly to repeatedly throw the broken fragments upwardly so that they return by gravity back upon the plate for repeated fragmentizing impact by the vanes. The size of the resulting broken fragments can be controlled by the speed of rotation of the plate as well as the time of operation. The fragments fall off the peripheral edge of the plate into a container located below it so that the fragments may then be removed from the cabinet.

The system for rotating the plate includes a motor mounted below the plate upon brackets arranged at spaced points around the side of the plate so that the brackets themselves additionally function as breaking anvils in cooperation with the adjacent vane edges.

Thus, the invention herein contemplates a very simple, inexpensive construction which is compact and which completely encloses the operating mechanism which essentially comprises only one moving part, namely, the vane carrying plate. Thus, the device may be easily installed in peopled areas, such as bars, restaurants, institutions where food or bottles are handled, private dwelling homes, etc. Because the glass articles to be broken are completely enclosed and the fragments are prevented from flying outwardly therefrom during the breaking operation, danger to persons nearby is completely eliminated. Likewise, because the fragments are reduced to smooth sand-like pellets of small size, these too can be handled even manually, with little danger of injury.

One of the objects of this invention is to provide a glass breaker or fragmentizing plate mechanism which is formed with vanes shaped to perform the functions of first providing a sharp impact area for breakage of a bottle or glass object dropped upon it, and thereafter, to repeatedly both impact the glass fragments as well as throw them upwardly for causing them to gravity drop back upon the plate for further impacting and more complete and uniform fragmentization.

These and other objects and advantages of this invention will become apparent upon reading the following description, of which the attached drawings form a part.

DESCRIPTION OF DRAWINGS

FIG. 7 is an enlarged, cross-sectional, fragmentary view of the plate and motor and support assembly.

FIG. 8 is a perspective view showing the plate mounted within the adjacent support assembly.

FIG. 9 is an enlarged, fragmentary cross-sectional view of the closure through which bottles are inserted and is taken in the direction of arrows 9—9 of FIG. 1.

FIG. 10 is a perspective view of the pair of sheets which make up the closure of FIG. 9.

DETAILED DESCRIPTION

Figure 1:
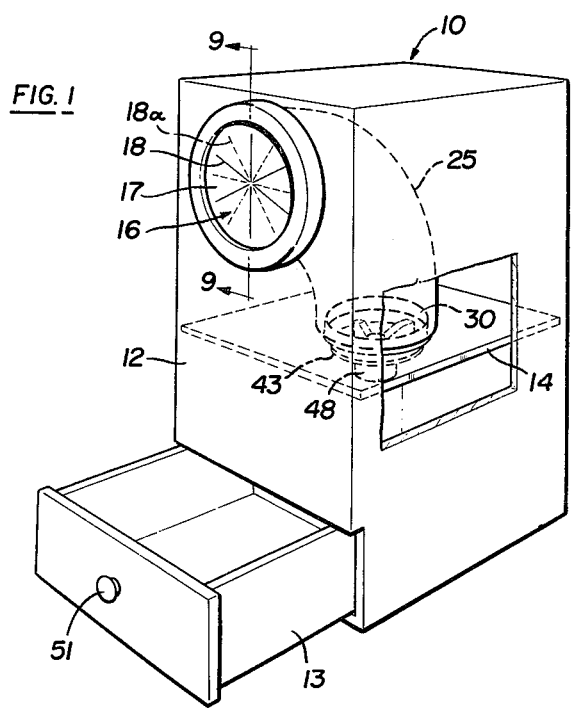
FIG. 1 is a perspective view of the bottle crusher or breaker with certain of the internal construction shown in dotted or phantom lines.
Figure 2:
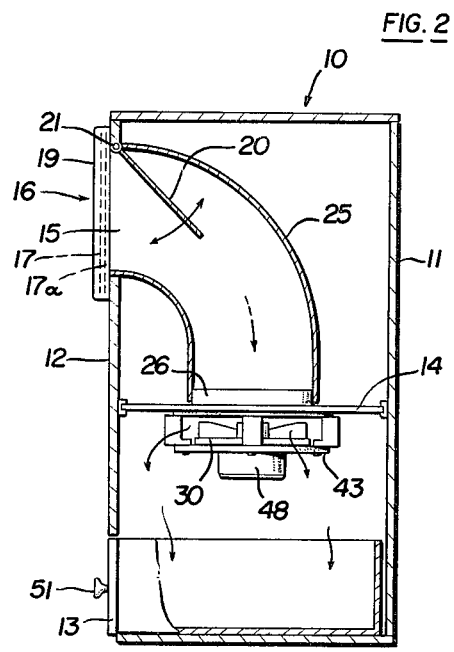
FIG. 2 is a cross-sectional elevational side view of the bottle crusher.
Figure 3:
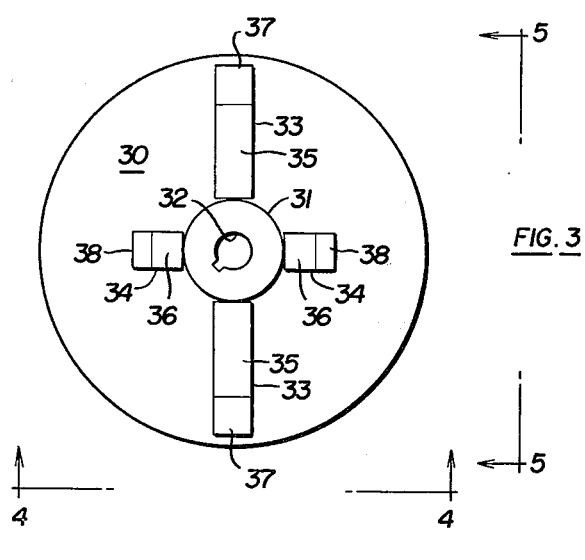
FIG. 3 is an enlarged plan view of the crusher or breaking breaker
Figure 6:
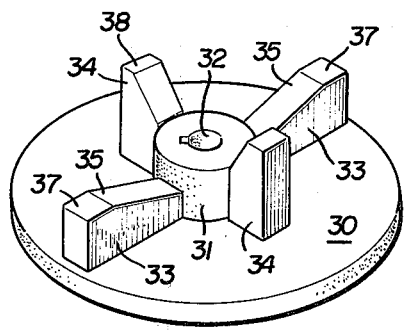
FIG. 6 is a perspective view of the plate.
Figure 4:
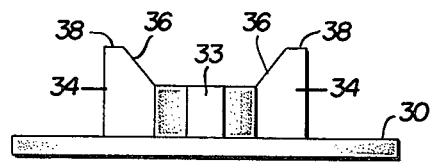
FIG. 4 is an elevational view taken in the direction of arrows 4—4 of FIG. 3, of the plate.
Figure 5:
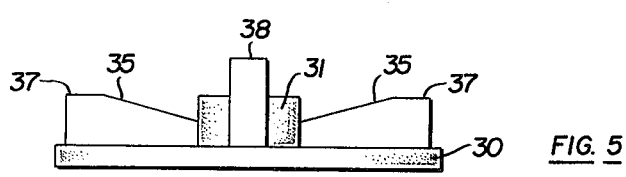
FIG. 5 is an elevational view of the plate taken in the direction of arrows 5—5 of FIG. 3.

The glass bottle or article breaker, generally designated as 10, includes a suitable cabinet or housing 11 having a front wall 12, a bottom pullout drawer 13 mounted for opening and closing manually, and a central, horizontally located partition or plate 14.

An opening 15 is formed at the upper end of the front wall 12. The opening is covered by a closure 16 which preferably is formed of a pair of generally circular, thin, resilient, but relatively stiff plastic sheets 17 and 17a, each having radially directed slits formed therein, with the slits 18 of the sheet 17 being angularly offset relative to the slits 18a of the sheet 17a. The sheets are secured together and to the wall 12 by means of a suitable ring-like molding 19 (see FIG. 9).

The sheets are sufficiently resilient so that glass articles to be broken may be manually pushed through the center of the sheets, that is, forcing aside the triangular shaped flaps formed by the slits 18–18a for passage therethrough of the article, with these flaps returning to their normal flat or closed position upon passage of the article therethrough.

Preferably, an additional rigid flap or door 20, secured by a conventional hinge 21 to the upper end of the of the opening 15, is provided to insure against the return passage through the opening of glass fragments. The flapper or door 20 may be suspended by gravity over the opening, or alternatively, a conventional spring type hinge may be used for spring urging the door 20 into a vertical normal position.

Mounted inside of the cabinet is a curved chute 25 formed in the shape of a large diameter sheet metal tubular elbow which curves downwardly and with its open lower end fitted around a raised ring 26 formed on the partition 14 surrounding an opening formed in the center of the partition. Arranged in such opening, below the ring, is a flat, disk-like crusher or breaker plate 30 having a central hub 31 with an opening 32 formed therein for receiving a motor driven shaft.

The upper surface of the crusher plate 30 is provided with two pairs of ribs or vanes, namely, long vanes 33 and short vanes 34. These vanes may be formed integrally with the plate by casting the plate as a single unit or alternatively may be formed as separate elements welded to a flat plate.

The upper edges 35 of the long vanes are sloped radially outwardly and upwardly from the center of the disk so that their inner ends are below the upper surface of the hub and their outer edges are at about the upper height of the hub. Likewise, the short vanes 34 have their upper edges 36 sloped, but at a much sharper angle to a height which is considerably above the height of the hub. Thus, high points or small impact areas or anvil areas 37 and 38 are formed on the respective outer edges of the vanes.

L-shaped support brackets 40 are secured, as by welding, to the lower surface of the partition 14 so that their lower legs 41 extend radially inwardly. Screw receiving holes 42 are formed on these lower legs. Thus, a motor support plate 43 is attached to the bracket lower legs by means of screws 44 extending through holes 45 in the motor support plate.

Fastened to the motor support plate by any conventional means is an electrial motor 48 which is arranged so that its shaft 49 extends vertically upwardly through a hole 50 in the motor support plate and engages within the hole 32 in the plate hub 31 where it may be fastened by means of a conventional key or set screw or the like for rotation of the plate 30.

A suitable electrical connection is provided for the motor with switches for energizing the motor either upon manual operation of the switch or alternatively by an automatic switch operated whenever the flap or door 20 is pushed inwardly by an entering glass article. Such type of electrical controls are conventional and therefore are omitted from the description herein.

In operation, the user of the device manually inserts a glass bottle or other glass article through the closure 16 by merely pushing the article sufficiently to cause the flaps in the plastic sheets to separate and to cause the door 20 to swing upwardly and out of the way. The glass article falls down the chute 25 where it lands upon the high points 38 of the short vanes in the first instance, thus, causing the glass to break.

Thereafter, the rotation of the plate 30 causes the vanes to repeatedly impact the glass fragments to break them into smaller and smaller sizes which will become relatively uniform in size and upon operation of the plate at suitable speed, will produce sand-like particles which are relatively smooth to manually handle. The breaking fragments of glass are repeatedly thrown upwardly by the sloped upper edges of the vanes thereby causing them to gravity drop back down upon the plate for repeated impacts.

Ultimately, the small particles of fragmentized glass are thrown radially outwardly of the plate below the partition 14 where they land in the drawer 13. From time to time, the drawer may be emptied by manually grasping the drawer hand pull 51, opening the drawer, and then dumping its contents into a suitable container. Although the drawer may be relatively small compared to the cabinet size, a large number of glass articles or bottles may be fragmentized since the fragments are considerably more compact than the original article itself.

Having fully described an operative embodiment of this invention, I now claim:

1. A breaker for glass articles, such as bottles and the like, comprising:
    a downwardly directed chute having an upper end into which glass bottles and the like may be inserted, and an open lower end;
    a horizontally arranged, vertically axised, rotatable plate arranged at and approximately coaxial with said chute lower end, so that the plate at all times closes said lower end;
    narrow vanes formed on the upper surface of said plate, with said vanes extending radially of the plate and having small area high points formed upon their upper edges for breaking the glass articles dropped upon them, wherein glass articles dropped into the upper end of the chute land upon the plate and vanes so that said high points initially break the articles and thereafter said vanes repeatedly impact the glass articles and fragments of glass therefrom, to break them into desired small size particles which fall off the peripheral edge of the plate;
    and means located below the plate for collecting the broken particles.

2. A construction as defined in claim 1, and with the upper edges of said vanes being sloped upwardly from the center of the plate radially outwardly, for thereby throwing fragments upwardly of the plate.

3. A construction as defined in claim 1, and at least one of said vanes extending to close to the peripheral edge of the plate and at least another of said vanes extending to a point considerably inwardly of the peripheral edge of the plate, which point is higher, i.e., above the plate surface, than the high point on said one vane.

4. A construction as defined in claim 1, and said chute being in the form of a tube having a closure for its upper end, with said closure formed of a pair of sheets of a relatively stiff, but resilient material arranged in substantial face to face contact and secured at their edges to each other and around the tube upper end;
    with said sheets having a number of equally spaced apart radially directed slits extending from its center towards its outer edge to form flexible segments, but with the slits of one sheet being offset relative to the slits of the other sheet so that the segments of one sheet overlap the slits of the other sheet, whereby bottles and the like may be pushed through the sheets due to the spreading apart of the segments thereof at the slits, but the sheets normally remain flat and seal against glass fragments returning from the plate out towards the upper end of the chute.

5. A construction as defined in claim 1, and said chute being in the form of a relatively large diameter, curved tube whose upper end opens in a vertical plane and whose lower end opens in a horizontal plane above the plate, for thereby enclosing glass fragments within the tube.

6. A glass article breaker comprising:
    a rotatable flat disk-like plate having a short and a long narrow radially directed vane formed upon its upper surface;
    with the upper edge of each vane being sloped upwardly from the center of the plate towards the plate outer edge, and terminating in a small area high point, but with the slope of the short vane being greater than and its high point being higher than that of the long vane;

a chute arranged above the plate for directing glass articles, such as bottles and the like for gravity dropping upon the plate and vane high points for initially breaking the glass;

and means for rotating the plate, wherein said vanes repeatedly impact the glass and the sloped upper edges of the vanes throw the glass upwardly for gravity dropping back down upon the plate and vanes.

7. A construction as defined in claim 6, and said chute being in the form of a tube whose open low end is arranged in a horizontal plane above and around the plate, and with the tube being bent along its length so that its upper end is formed with an opening arranged in a vertical plane.

8. A construction as defined in claim 6 and said means for rotating the plate comprising a vertically axised motor located below the plate and supported upon brackets which extend upwardly along the peripheral edge of the plate, with the motor having a drive shaft connected to the plate for rotation of the plate, and with said brackets cooperating with the outer edges of the long vanes for breaking glass fragments.

9. A breaker for glass articles, such as bottles and the like, comprising:

a downwardly directed chute having an upper end into which glass bottles and the like may be inserted, and an open lower end;

a horizontally arranged, vertically axised, rotatable plate arranged at said chute lower end;

narrow vanes formed on the upper surface of said plate, with said vanes extending radially of the plate and having small area high points formed upon their upper edges for breaking the glass articles dropped upon them, wherein said vanes repeatedly impact the glass articles and fragments of glass therefrom, to break them into desired small size particles which fall off the peripheral edge of the plate;

with the upper edges of said vanes being sloped upwardly from the center of the plate radially outwardly, for thereby throwing fragments upwardly of the plate; and means located below the plate for collecting the broken particles.

10. A breaker for glass articles, such as bottles and the like, comprising:

a downwardly directed chute having an upper end into which glass bottles and the like may be inserted, and an open lower end;

a horizontally arranged, vertically axised, rotatable plate arranged at said chute lower end;

narrow vanes formed on the upper surface of said plate, with said vanes extending radially of the plate and having small area high points formed upon their upper edges for breaking the glass articles dropped upon them, wherein said vanes repeatedly impact the glass articles and fragments of glass therefrom, to break them into desired small size particles which fall off the peripheral edge of the plate;

at least one of said vanes extending to close the peripheral edge of the plate and at least another of said vanes extending to a point considerably inwardly of the peripheral edge of the plate, which point is higher, i.e., above the plate surface, than the high point on said one vane, and;

means located below the plate for collecting the broken particles.

11. A breaker for glass articles, such as bottles and the like, comprising:

a downwardly directed chute having an upper end into which glass bottles and the like may be inserted, and an open lower end;

a horizontally arranged, vertically axised, rotatable plate arranged at said chute lower end;

narrow vanes formed on the upper surface of said plate, with said vanes extending radially of the plate and having small area high points formed upon their upper edges for breaking the glass articles dropped upon them, wherein said vanes repeatedly impact the glass articles and fragments of glass therefrom, to break them into desired small size particles which fall off the peripheral edge of the plate;

means located below the plate for collecting the broken particles;

a vertically axised motor arranged below the plate, with the motor having an upwardly extending drive shaft connected to the center of the plate for rotation thereof;

vertically arranged support brackets arranged at spaced points around the spaced closely to the periphery of the plate, with said motor being secured to and supported by said support brackets; and wherein the support brackets cooperate with the plate vanes for breaking glass fragments therebetween.

12. A construction as defined in claim 11, and including at least one vane terminating roughly midway of the radius of the plate and having its upper edge sloping upwardly from the center of the plate to a higher point located considerably above the height of the high point of another vane which extends close to and whose high point is adjacent the peripheral edge of the plate.

* * * * *